United States Patent Office 3,698,910
Patented Oct. 17, 1972

3,698,910
LIGHT-SENSITIVE SILVER HALIDE
PHOTOGRAPHIC MATERIAL
Kaiichiro Sakazume, Shigemasa Ito, and Shui Sato, Tokyo,
Eiichi Sakamoto, Hanno, and Akio Oshima, Tokyo,
Japan, assignors to Konishiroku Photo Industry Co.,
Ltd., Tokyo, Japan
No Drawing. Filed June 23, 1970, Ser. No. 49,182
Claims priority, application Japan, June 23, 1969,
44/48,893
Int. Cl. G03c 1/08
U.S. Cl. 96—122                                                          1 Claim

ABSTRACT OF THE DISCLOSURE

New dimethine merocyanine dyes containing, in addition to a thiohydantoin nucleus, two water-solubilizing groups in a single molecule was found particularly effective for sensitization of a green-light sensitive silver photographic emulsion. The dyes can be represented by the general formula

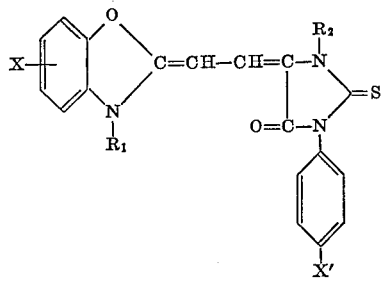

(I)

wherein $R_1$ is a sulfoalkyl or carboxyalkyl group which may be in salt form; $R_2$ is a carboxylalkyl group; X is a hydrogen or halogen atom or an alkyl or alkoxy group; and X' is a hydrogen or chlorine atom.

---

The present invention relates to green light-sensitive silver halide photographic materials which have been color-sensitized with a dimethine merocyanine dye of the type represented by the general formula

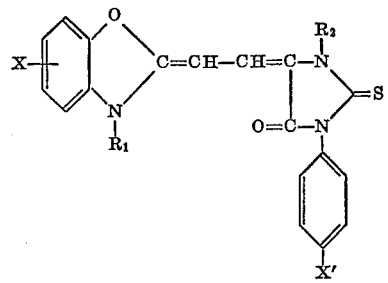

(I)

wherein $R_1$ is a sulfoalkyl or carboxyalkyl group which may be in salt form; $R_2$ is a carboxylalkyl group; X is a hydrogen or halogen atom or an alkyl or alkoxy group; and X' is a hydrogen or chlorine atom.

We previously disclosed in Belgian Pat. No. 716,831 that dimethine-merocyanine compound containing a 1,3-substituted thiohydantoin nucleus is a useful sensitizing dye for silver halide photographic emulsions. As the result of further studies, however, we have found that a dye having two water-solubilizing groups in a single molecule, as seen in the above-mentioned general formula, has excellent photographic properties.

The sensitizing dye of the present invention has such characteristics that it does not cause any deterimental interactions even when applied to a light-sensitive silver halide photographic material containing a gelatine coagulant or a physical property-improving agent, and that it scarcely colors an image formed particularly by the quick development of a light-sensitive photographic material which has been color-sensitized therewith. Thus, the sensitizing dye of the present invention is entirely free from deterioration in physical properties or commercial value of the resulting image due to residual color, which has been a drawback of the conventional sensitizing dyes of this kind. In addition, the sensitizing dye of the present invention has the advantage that it does not lose color-sensitizing ability even when used in combination with a surface active agent or a color coupler.

Furthermore, the conventional sensitizing dye has poor solubility in an organic solvent such as methanol or ethanol and hence is difficult to form into solutions having a required dye concentration. However, the dye of the present invention shows extremely high solubility in methanol or ethanol and in a mixed solvent thereof with water, so that not only the preparation of a dye solution but also the purification of dye at the time of synthesis are quite easy. Accordingly, the light-sensitive silver halide photographic material in accordance with the present invention into which has been incorporated the dye of the aforesaid general formula is not only high in speed but also has stable color sensitiveness even under severe conditions.

The sensitizing dye used in the present invention is synthesized, in general, by condensing at an elevated temperature a compound (a) of the formula

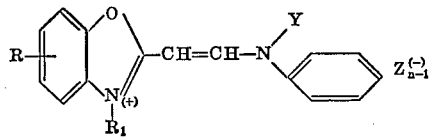

wherein X and $R_1$ are as defined above; Y is a hydrogen atom or an acetyl group; Z is an anion; and $n$ is 1 or 2, with a compound (b) of the formula

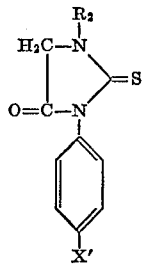

wherein $R_2$ and X' are as defined previously, in a suitable solvent such as, for example, pyridine, methanol, alcohol or cresol, in the presence of a basic condensing agent such as, for example, piperidine or triethylamine.

The compound (a) is obtained by fusing a quaternary ammonium salt of 2-methylbenzoxazole together with diphenylformamidine; or reacting the two in acetic anhydride. The compound (b), e.g. 1-carboxyethyl-3-phenyl-2-thiohydantoin, is synthesized in such a manner that 1-β-cyanoethyl-3-phenyl-2-thiohydantoin is charged in a 6% alcoholic aqueous caustic soda solution; the resulting mixture is refluxed in an oil bath for 2 hours, cooled and neutralized with dilute hydrochloric acid; and deposited crystals are recovered by filtration, washed with water and then recrystallized from alcohol to obtain white crystals of said thiohydantoin, M.P. 195°–197° C.

*Elementary analysis.*—Calculated (percent): C, 54.52; H, 4.57; N, 10.60. Found (percent): C, 54.30; H, 4.93; N, 10.93.

Typical synthesis examples and concrete examples of the sensitizing dyes used in the present invention are set forth below, but it should be construed that these examples are not limitative.

SYNTHESIS EXAMPLE 1

Synthesis of dye (1), sodium salt of 1 - carboxymethyl-5 - [(3 - sulfopropyl - 2 - (3)benzoxazolidene)ethyl-dene]-3-phenyl-2-thiohydantoin of the formula

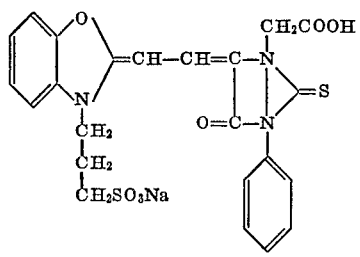

3.58 g. of anhydro - 2 - β - anilide - vinylbenzoxazole-sulfopropionate and 2.5 g. of 1-carboxymethyl-3-phenyl-2 - thiohydantoin were charged into a liquid mixture comprising 0.85 g. of piperidine and 30 ml. of pyridine, and the resulting mixture was refluxed over an oil bath for 1 hour. Thereafter, a methanol solution of sodium iodide was added to the mixture to deposit dye crystals. The dye crystals were recovered by filtration and then recrystallized from a mixed solvent of methanol and water to obtain 1.72 g. of reddish orange crystals, M.P. above 300° C.

Spectral absorption maximum 487 mμ (in methanol).

SYNTHESIS EXAMPLE 2

Synthesis of dye (2), 1 - carboxyethyl - 5 - [(3 - carboxyethyl - 2 - (3) - benzoxazolidene)ethylident] - 3-phenyl - 2 - thiohydantoin of the formula

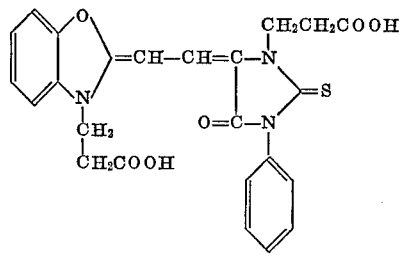

1.56 g. of 2 - β - anilide - vinylbenzoxazole - bromopropionate and 1.06 g. of 1 - carboxyethyl - 3 - phenyl-2 - thiohydantoin were charged into a liquid mixture comprising 0.45 g. of triethylamine and 15 ml. of pyridine, and the resulting mixture was refluxed over an oil bath for 45 minutes. Thereafter, the mixture was neutralized with dilute hydrochloric acid to deposit dye crystals. The dye crystals were recovered by filtration, suspended in a small amount of ethanol, dissolved by addition of triethylamine, and then recrystallized from dilute hydrochloric acid. Subsequently, the crystals were washed with water-alcohol-ether to obtain 0.97 g. of red crystals, M.P. 263°–267° C.

Spectral absorption maximum 488 mμ (in methanol)

SYNTHESIS EXAMPLE 3

Synthesis of dye (3), sodium salt of 1 - carboxyethyl-5-[(3-sulfobutyl - 2 - (3) - benzoxazolidene)ethylidene]-3-phenyl-2-thiohydantoin of the formula

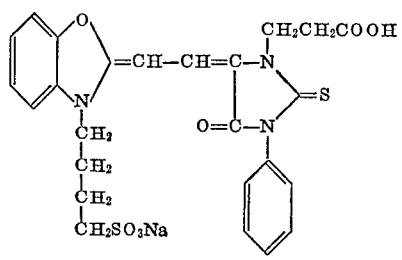

1.97 g. of anhydro - 2 - β - acetanilide - vinylbenzoxazole-butanesulfonate and 1.4 g. of 1 - carboxyethyl-3-phenyl - 2 - thiohydantoin were charged into 30 ml. of ethanol containing 4 ml. of triethylamine, and the resulting mixture was reacted over a water bath at 70° C. for 30 minutes. To the reaction liquid was added a methanol solution of sodium iodide, and the liquid was allowed to stand to deposit dye crystals. The dye crystals were recovered by filtration and then recrystallized from a solution of methanol and water to obtain 0.4 g. of red crystals, M.P. above 320° C.

Spectral absorption maximum 489 mμ (in methanol)

SYNTHESIS EXAMPLE 4

Synthesis of dye (4), 1 - carboxymethyl - 5 - [(3-sulfobutyl - 5 - methylbenzoxazolidene)ethylidene]-3-phenyl-2-thiohydantoin of the formula

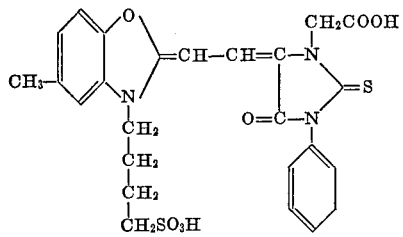

1.54 g. of anhydro - 2 - β - anilide - vinyl - 5 - methylbenzoxazole - butanesulfonate and 1 g. of 1 - carboxymethyl - 3 - phenyl - 2 - thiohydantoin were charged into 10 ml. of pyridine containing 0.4 g. of piperidine, and the resulting mixture was refluxed over an oil bath for 45 minutes. Thereafter, the reaction liquid was cooled and neutralized with dilute hydrochloric acid to deposit dye crystals. The dye crystals were recovered by filtration, washed with a small amount of water-alcohol and then recrystallized from methanol to obtain 0.44 g. of red crystals, M.P. 239°–242° C.

Spectral absorption maximum 492 mμ (in methanol).

In the same manner as above, there were obtained dyes (5) to (15) of the formula

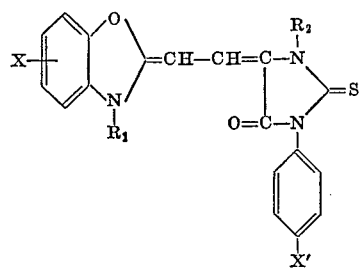

wherein X, $R_1$, $R_2$ and X' were as shown in the table below. The physical properties of the dyes are set forth in the table.

may be added to a silver halide photographic emulsion by adoption of any known procedure. For example, the dye may be added after dissolving the same in a water-miscible organic solvent such as methanol, ethanol or the like. Further, the dye may be added at any time during the step for preparation of the emulsion, but is preferably added immediately before completion of the second ripening, in general. The amount of the dye to be added varies depending on the kind of the silver halide photographic emulsion used, but is ordinarily within such a wide range as from 1 to 100 mg. per kg. of the emulsion, and may be increased or decreased, if necessary.

The silver halide photographic emulsion employed may be any emulsion of silver bromide, silver iodobromide, silver chloride, silver chlorobromide, silver chloroiodobromide or the like. Further, the emulsion may have been subjected to sensitization methods using any of noble metal sensitizers, sulfur sensitizers, reducing sensitizers or polyalkylene oxide type sensitizers.

The dye employed in the present invention may be supersensitized by using the same in combination with other sensitizing dye, e.g. cyanine or merocyanine. Particularly, the combination use with the merocyanine dyes disclosed in Belgian Pat. No. 716,831 is preferable.

As a particular aspect, therefore, the present invention includes the joint use of a sensitizing dye of the before-mentioned general Formula I with a merocyanine dye of the general Formula II

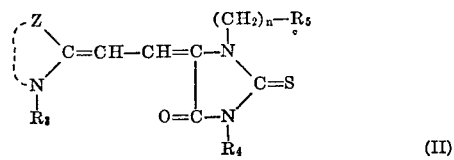

(II)

wherein $R_3$ is a substituted or unsubstituted alkyl group; $R_4$ is a substituted or unsubstituted alkyl, aryl, alkenyl or aralkyl group; $R_5$ is hydroxy, cyano, alkoxy, carboxy, acyloxy or carbamoyl group; $n$ is an integer of 2 to 3; and Z means an atomic grouping capable of forming, together with the adjacent nitrogen and carbon atoms, a 5- or 6-membered heterocyclic nucleus which may have a substituent, thereby to effect supersensitization for a light-sensitive silver halide photographic emulsion.

Typical merocyanine dyes which are expressed by the general Formula II and which are particularly usable in

| Dye | X | $R_1$ | $R_2$ | X' | M.P. | $\lambda_{max.}$ (mμ) (in MeOH) |
|---|---|---|---|---|---|---|
| Dye (5) | 5-CH₃ | —CH₂CH₂COOH | —CH₂CH₂COOH | H | 271~273° C | 491 |
| Dye (6) | 6-CH₃ | —(CH₂)₄SO₃H | —CH₃COOH | H | 230~233° C | 493 |
| Dye (7) | H | —(CH₂)₄SO₃Na | —CH₃COOH | H | Above 310° C | 489 |
| Dye (8) | H | —(CH₂)₃SO₃K | —CH₂CH₂COOH | H | Above 320° C | 489 |
| Dye (9) | H | —CH₂CH₂CH—SO₃Na<br>            CH₃ | —CH₂COOH | H | Above 300° C | 487 |
| Dye (10) | H | —CH₂CH₂SO₃Na | —CH₂CH₂COOH | H | do | 487 |
| Dye (11) | H | —CH₂CH₂COOH | —CH₂COOH | Cl | 242~245° C | 488 |
| Dye (12) | 5-OCH₃ | —CH₂CH₂COOH | —CH₂COOH | Cl | 217~220° C | 494 |
| Dye (13) | H | —CH₂CH₂COOH | —CH₂CH₂COOH | Cl | 278~280° C | 488 |
| Dye (14) | 5,6-di-CH₃ | —CH₂CH₂COOH | —CH₂CH₂COOH | H | 265~267° C | 493 |
| Dye (15) | 5-Cl | —(CH₂)₃SO₃Na | —CH₂COOH | H | Above 300° C | 483 |

Each of the sensitizing dyes represented by the aforesaid formula which are obtained in the above manner combination with the sensitizing dyes of the general Formula I are set forth in the table below.

| Dye | $\begin{array}{c} {}^{,-Z}\diagdown \\ \phantom{-}{\sf N}\diagdown{\sf C}\phantom{-} \end{array}$ | R₃ | R₄ | R₅ | M.P. (° C.) | λmax. (mµ) (in MeOH) |
|---|---|---|---|---|---|---|
| Dye (16) |  | —C₂H₅ | 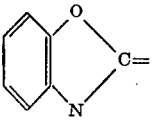 | —CH₂CH₂OH | 278–281 | 492 |
| Dye (17) | Same as above | —C₂H₅ | Same as above | —CH₂CH₂OCOCH₃ | ¹ 250–252 | 492 |
| Dye (18) | do | —CH₂ CH₂ CH₂SO₃HN | 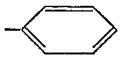 | —CH₂CH₂OH | 205–207 | 488 |
| Dye (19) | 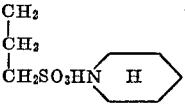 | —C₂H₅ | do | —CH₂CH₂COOH | 295–298 | 500 |
| Dye (20) | 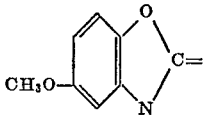 | —CH₂CH₂COOH | do | —CH₂CH₂OH | 233–235 | 490 |
| Dye (21) | Same as above | —CH₂CH₂COOH | do | —CH₂CH₂CN | 248–251 | 490 |
| Dye (22) | 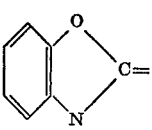 | —CH₃ | do | —CH₂CH₂OCOCH₃ | ¹ 285–287 | 528 |
| Dye (23) | Same as above | —C₂H₅ | do | —CH₂CH₂COOH | 293–296 | 530 |
| Dye (24) | 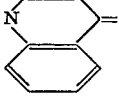 | —C₂H₅ | —CH₂CH=CH₂ | —CH₂CH₂CN | 170–172 | 624 |

¹ Decomposition.

Furthermore, the above-mentioned photographic emulsions may include any of conventional photographic additives such as, for example, stabilizers, hardeners, coating aids and color couplers.

The above-mentioned photographic emulsion containing the sensitizing dye employed in the present invention is coated according to an ordinary procedure on a suitable support such as glass, triacetate base, polyester base or paper, followed by drying, whereby the light-sensitive silver halide photographic material of the present invention can be obtained. The thus obtained photographic material shows a high sensitiveness, as mentioned previously, and has such excellent photographic properties with markedly less fog and dye stains. Particularly, the photographic material causes no detrimental interaction with gelatine coagulants or emulsion property-improving agents nor deterioration in photographic properties, such as increase of fog or decrease of color speed, owing to variation of external conditions (e.g. at high temperature and high humidity) or variation in behavior of the emulsion due to lapse of time.

The present invention is illustrated in further detail below with reference to examples, but these are merely examples of the invention, and the present invention is not to be construed as limited only to these.

Example 1

A silver iodobromide emulsion containing 3 mol percent of silver iodide which had been treated with a gelatine coagulant was subjected to second ripening according to gold and sulfur sensitization method to prepare a high speed negative emulsion. This emulsion was divided into several portions, which were then incorporated individually with a methanol solution of each of the sensitizing dyes shown in Table 1. The thus treated emulsions were allowed to stand with stirring at 40° C. for 20 minutes to be stabilized in color sensitiveness, and then coated individually on a film base, followed by drying, to obtain green light-sensitive photographic materials.

Using a sensitometer (Model KS–1, manufactured by Konishiroku Photo Industrial Co., Ltd.), each of the thus obtained samples was exposed to a 160 lux daylight lamp (5400° K.) with a filter capable of transmitting long wave lights of more than 500 mµ, and then developed at 20° C. for 5 minutes with a developer of the following composition:

| | G. |
|---|---|
| Metol | 3 |
| Anhydrous sodium sulfite | 50 |
| Hydroquinone | 6 |
| Sodium carbonate (monohydrate) | 29.5 |
| Potassium bromide | 1 |
| Water to make 2 liters. | |

The results obtained were as shown in Table 1. In the table, the speed is a relative speed measured by rating as 100 the speed of the emulsion to which the dye had not been added.

TABLE 1

| Color sensitizer | Amount added ¹ | Fog | Speed | Sens. max. (mµ) |
|---|---|---|---|---|
| Dye (1) | 50 | 0.04 | 730 | 540 |
| Dye (2) | 50 | 0.05 | 800 | 550 |
| Dye (4) | 50 | 0.04 | 750 | 540 |
| Dye (10) | 50 | 0.04 | 770 | 550 |
| Dye (13) | 50 | 0.04 | 830 | 545 |

¹ Methanol solution (cc./kg. emulsion).

9

As is clear from the above table, the samples according to the present invention are high in speed and have no detrimental actions with other chemicals added.

Example 2

A silver chlorobromide emulsion which had been treated with a gelatine coagulant was subjected to second ripening according to chemical sensitization method. Thereafter, the emulsion was divided into several portions, which were then incorporated individually with a methanol solution of each of the present sensitizing dyes shown in Table 2. Subsequently, to the thus treated emulsions was added a given amount of a dispersion of acrylic ester resin as an emulsion property-improving agent for photographic emulsions. Some of these photographic emulsions were coated, immediately after preparation, on film bases, while the others were allowed to stand with stirring at 40° C. for 3 hours and then coated on film bases, followed by drying, to prepare samples.

For comparison, control samples were prepared under the same conditions as above, except that the known sensitizing dyes set forth below were used.

Control dye (A):

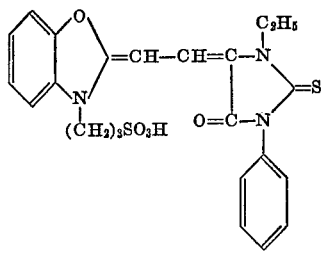

Control dye (B):

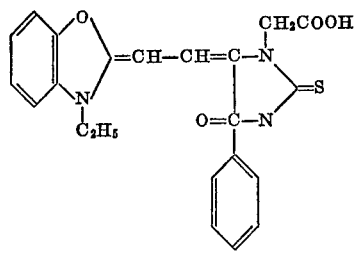

The thus prepared samples were exposed in the same manner as in Example 1, developed with the developer D-72 (product of Eastman Kodak Co.) and then subjected to sensitometry to obtain the results set forth in Table 2. In the table, the speed is represented by a relative value measured by rating as 100 the speed of the control dye (A), and the residual color is represented by the density according to color densitometer.

TABLE 2

| Color sensitizer | Amount added [1] | Sample prepared by coating the emulsion immediately after preparation | | Sample prepared by coating the emulsion allowed to stand at 40° C. for 3 hours | |
|---|---|---|---|---|---|
| | | Residual color | Speed | Residual color | Speed |
| Dye (1) | 40 | 0.03 | 105 | 0.03 | 100 |
| Dye (3) | 40 | 0.04 | 120 | 0.04 | 120 |
| Dye (9) | 40 | 0.03 | 115 | 0.03 | 110 |
| Dye (11) | 40 | 0.04 | 125 | 0.04 | 130 |
| Control dye (A) | 40 | 0.06 | 100 | 0.06 | 95 |
| Control dye (B) | 40 | 0.06 | 95 | 0.07 | 90 |

[1] Methanol solution (cc./kg. emulsion).

As is clear from the above table, the samples of the present invention attain high speed and stable color sensitiveness without causing any detrimental interactions even when the dyes are present together with gelatine coagulants or physical property-improving agents, and that they are lower than the control samples, in residual color of the dyes after development treatment.

Example 3

A silver iodobromide emulsion containing 3 mol percent of silver iodide which had been treated with a gelatine coagulant (e.g. naphthalenesulfonic acid-formaldehyde condensates) was subjected to second ripening. This emulsion was divided into several portions, which were then incorporated individually with a methanol solution of each of the sensitizing dyes (I) alone or in combination with a methanol solution of each of the sensitizing dyes (II), as shown in Table 3. The thus treated emulsions were allowed to stand with stirring to stabilize in color sensitivity, and then coated individually on a film base, followed by drying, to obtain light-sensitive photographic materials.

Using the same sensitometer as used in Example 1, each of the thus obtained samples was exposed to a 125 lux daylight lamp (2660° K.) with a blue or green filter having a transmission maximum of 450 m$\mu$ or 525 m$\mu$, respectively, and then developed at 20° C. for 3 minutes with a developer as used in Example 1. The results obtained were shown in Table 3. In the table, the speed is a relative speed measured by rating as 100 the green light speed of the emulsion to which Dye (1) had been added singly.

TABLE 3

| Sensitizer used and its amount (methanol solution) (cc./kg. emulsion) | Blue light speed | Green light speed | Residual color |
|---|---|---|---|
| Dye (1), 50 cc | 80 | 100 | 0.03 |
| Dye (8), 50 cc | 80 | 90 | 0.04 |
| Dye (16), 50 cc | 70 | 120 | 0.04 |
| Dye (18), 50 cc | 80 | 110 | 0.03 |
| Dye (1), 30 cc. plus dye (18), 20 cc | 90 | 190 | 0.02 |
| Dye (1), 20 cc. plus dye (18), 30 cc | 80 | 180 | 0.02 |
| Dye (8), 30 cc. plus dye (16), 20 cc | 90 | 170 | 0.02 |
| Dye (8), 20 cc. plus dye (16), 30 cc | 90 | 160 | 0.03 |
| Dye (20), 50 cc | 60 | 90 | 0.04 |
| Dye (21), 50 cc | 70 | 80 | 0.04 |
| Dye (22), 50 cc | 70 | 70 | 0.05 |
| Dye (1), 20 cc. plus dye (20), 30 cc | 90 | 160 | 0.03 |
| Dye (1), 20 cc. plus dye (21), 30 cc | 80 | 140 | 0.03 |
| Dye (1), 30 cc. plus dye (22), 20 cc | 80 | 130 | 0.04 |

As is clear from the above table, it is understood that joint use of the sensitizing dyes [I] with those [II] can provide high orthochromatic sensitivity and decreased residual color, both of which cannot be attained by single use of the sensitizing dyes [I] or [II]. Thus, synergistic effects due to the particular combination of the sensitizing dyes [I] and [II] is observed through supersensitization over the blue and green light region.

What we claim is:

1. A light-sensitive silver halide photographic material, characterized by containing at least one sensitizing dye of the general Formula I

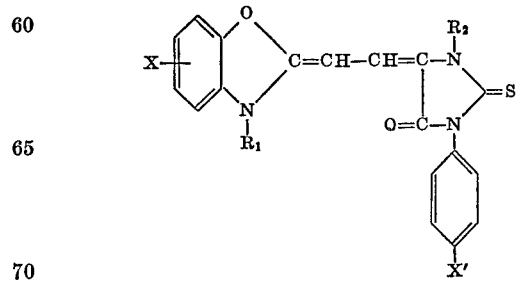

wherein $R_1$ is a sulfoalkyl or carboxyalkyl group which may be in salt form; $R_2$ is a carboxyalkyl group; X is a hydrogen or halogen atom or an alkyl or alkoxy group; and X' is a hydrogen or chlorine atom, further containing at least one sensitizing dye of the general Formula II

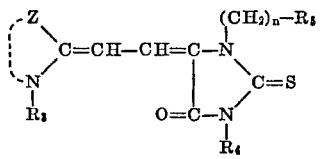

wherein $R_3$ is an alkyl group; $R_4$ is an alkyl, aryl, alkenyl or aralkyl group; $R_5$ is hydroxy, cyano, alkoxy, carboxy, acyloxy or carbamoyl group; $n$ is an integer of 2 to 3; and Z means an atomic grouping capable of forming, together with the adjacent nitrogen and carbon atoms, a 5- or 6-membered heterocyclic ring selected from benzoxazole, benzothiazole, and quinoline rings.

References Cited

UNITED STATES PATENTS

| | | | |
|---|---|---|---|
| 2,493,748 | 1/1950 | Brooker et al. | 96—140 |
| 2,497,876 | 2/1950 | Fallesen et al | 96—140 |
| 2,519,001 | 8/1950 | Sprague | 96—140 |
| 2,828,203 | 3/1958 | MacWilliam | 96—140 |

J. TRAVIS BROWN, Primary Examiner

U.S. Cl. X.R.

96—140